United States Patent
Xu et al.

(10) Patent No.: US 6,913,829 B2
(45) Date of Patent: Jul. 5, 2005

(54) POLYMER NUCLEATING AGENTS

(75) Inventors: Wen-Qing Xu, Northborough, MA (US); Damon Grabiec, Westfield, MA (US); Robert J. Nehring, Jr., Hopedale, MA (US)

(73) Assignee: Nyacol Nano Technologies, Inc., Ashland, MA (US)

( * ) Notice: Subject to any disclaimer, the term of this patent is extended or adjusted under 35 U.S.C. 154(b) by 0 days.

(21) Appl. No.: 10/324,855

(22) Filed: Dec. 20, 2002

(65) Prior Publication Data

US 2004/0122132 A1 Jun. 24, 2004

(51) Int. Cl.⁷ .................................................. B32B 1/00
(52) U.S. Cl. ....................................... 428/403; 428/404
(58) Field of Search ................................... 428/403, 404

(56) References Cited

U.S. PATENT DOCUMENTS

| | | | |
|---|---|---|---|
| 2,196,016 A | 4/1940 | Huehn et al. ................... 23/50 |
| 2,571,030 A | 10/1951 | Govett et al. ................. 167/90 |
| 2,645,616 A | 7/1953 | Govett et al. ................ 252/317 |
| 2,798,049 A | 7/1957 | White et al. ................. 252/313 |
| 2,876,163 A | 3/1959 | Garizio et al. ................ 167/90 |
| 2,915,475 A | 12/1959 | Bugosh et al. .............. 252/313 |
| 3,252,917 A | 5/1966 | Mindick et al. ............. 252/313 |
| 4,518,731 A * | 5/1985 | Zamboni et al. ............ 524/166 |
| 4,565,844 A * | 1/1986 | Kasahara et al. ........... 524/108 |
| 5,194,157 A * | 3/1993 | Ghezzi et al. .............. 210/646 |
| 5,300,549 A | 4/1994 | Ward et al. ................. 524/321 |
| 5,310,950 A | 5/1994 | Mannion .................... 549/364 |
| 5,319,012 A | 6/1994 | Ward et al. ................. 524/321 |
| 6,465,551 B1 | 10/2002 | Zhao et al. ................. 524/284 |
| 6,537,665 B2 | 3/2003 | O'Connor et al. .......... 428/403 |

OTHER PUBLICATIONS

"Nucleating Agents for Partly Crystalline Polymers," pp. 862–875, *Plastics Additive Handbook*, edited by Gachter & Muller, Hanser–Gardner Publications, Inc., Cincinnati, Ohio, ©1993.

* cited by examiner

*Primary Examiner*—Matthew A. Thexton
(74) *Attorney, Agent, or Firm*—Calfee, Halter & Griswold, LLP

(57) ABSTRACT

A polymer nucleating agent is composed of inorganic particles carrying an anchor layer capable of bonding to an organic acid, such as alumina-coated silica particles, and having a surface coating of a substituted or unsubstituted benzoic acid compound.

12 Claims, No Drawings

POLYMER NUCLEATING AGENTS

BACKGROUND OF THE INVENTION

Polymer nucleating agents are often included in thermoplastic crystalline and semi-crystalline polymers. They act as sites or nuclei for initiating polymer crystallization, thereby producing a greater number of smaller crystalline domains or "spherulites" in the solidified product. The result is that that polymer usually has a higher degree of crystallinity, which in turn normally results in an increase in hardness, elastic modulus, tensile strength and yield point compared with untreated polymers. Other properties such as ductility (elongation at break), impact strength and optical properties such as transparency, haze reduction and translucency are also often improved. Crystallization temperatures are often increased by nucleating agents. This leads to shorter cycle times during injection molding and like processes because less cooling is needed to achieve solidification. See Jansen et al., Nucleating Agents for Partly Crystalline Polymers, pp. 862–875, *Plastics Additives Handbook,* edited by Gachter & Muller, Hanser-Gardner Publications, Inc., Cincinnati, Ohio, © 1993, the disclosure of which is incorporated herein by reference, for a discussion of nucleating agents and their effect on crystalline and semi-crystalline polymers.

Many different materials, both organic and inorganic, are known to function as polymer nucleating agents. See, for example, U.S. Pat. No. 5,300,549 and U.S. Pat. No. 6,465,551. See, also, U.S. Pat. No. 6,537,665, which discloses that certain alumina-coated silica nano-powders carrying a surface coating of an organic acid also function as polymer nucleating agents. Finally, also note U.S. Pat. No. 5,310,950 to Michael J. Mannion, which teaches that certain ultrafine sorbitol and xylitol acetals work exceptionally well as clarifying agents in semi-crystalline polymers. The disclosures of all of these documents are incorporated herein by reference.

SUMMARY OF THE INVENTION

In accordance with the present invention, it has now been found that nano-powders of the type described in U.S. Patent No. 6.537.665 exhibit even better polymer nucleating properties if the surface coating is derived from benzoic acid or analog.

Thus, the present invention provides an improved polymer nucleating agent comprising inorganic particles having a benzoic acid compound bonded thereto, the benzoic acid compound being benzoic acid or a polynuclear aromatic acid having its carboxyl group directly attached to its polynuclear aromatic ring, the benzoic acid or polynuclear aromatic acid being unsubstituted or substituted with one or more non-aromatic substituents.

In addition, the present invention provides a new polymer product comprising a crystalline or semi-crystalline thermoplastic polymer containing one or more of these improved polymer nucleating agents.

DETAILED DESCRIPTION

Crystalline and Semi-Crystalline Thermoplastic Polymers

Many different thermoplastic polymers are known to crystallize to a greater or lesser extent when they solidify. Examples include the various different polyethylenes, e.g., high density polyethylene, low density polyethylene, linear low density polyethylene, polypropylene, copolymers of ethylene and propylene, copolymers of ethylene and no more than about 10 mol. % of another copolymerizable monomer, polyamides such as nylon 6 and nylon 66, polyesters such as polyethylene terephthalate, polybutylene terephthalate, ethylene terephthalate/butylene terephthalate copolymers, polycarbonates, isotactic polystyrene, polybutene-1 and so forth. See the above-noted patents and Jansen et al. article. All of these polymers can be improved by the polymer nucleating agents of the present invention.

Particulate Powder Substrate

The particulate powder which is provided with a benzoic acid or derivative coating in accordance with the present invention is composed of inorganic particles having a surface capable of bonding to an organic acid.

Essentially any inorganic particulate material can be used for this purpose. Examples include silica (all types), alumina, zirconia, titania, ceria, tin oxide, tin indium oxide, antimony tin oxide, zinc oxide, talc, mica, wollastonite, calcium carbonate, various clays, zeolites, and the like.

These inorganic particles should have a surface which allows them to bond to organic acids. For example, alumina has a surface chemistry which allows the carbonyl groups of organic acids to chemically bond to the oxygen atoms in the alumina surface when these two ingredients are contained in a neutral to mildly acidic aqueous composition from which the water is evaporated. Zirconia, ceria and calcium carbonate, for example, have a similar surface chemistry. Such materials can be used as is for bonding to benzoic acid or analog in accordance with the present invention, no additional treatment being necessary.

Other inorganic particles, however, may require some form of surface modification before they can bond to these acids. For example, although oxygen atoms abound in silica, the silanol chemistry of silica is too inert to allow bonding of organic acids to any significant degree. Therefore, it is desirable when such particle substrates are used to provide an underlayment or anchoring layer on the particle surfaces which is composed of alumina or another material which does bond to organic acids.

This is most easily done in accordance with the present invention by coating the substrate particles with a layer of alumina by the technique described in U.S. Pat. No. 3,252,917, the disclosure of which is also incorporated herein by reference. In this technique, the substrate particles are maintained in a substantially salt-free aqueous composition also containing a basic aluminum halide until the desired amount of alumina deposits on the substrate particles. The composition is then contacted with an anion exchange resin whose exchangeable anion is derived from a weak, volatile inorganic acid such as carbonate, bicarbonate or the like. This provides a substantially salt-free alumina-coated silica sol which is stable at pH's ranging from 4.5 to 6.5 and whose alumina-coated silica particles will readily bond to organic acids.

As described in U.S. Pat. No. 3,252,917, the aluminum halide starting material in this process is normally an aluminum halide which has been partly neutralized with a base or partially hydrolyzed as taught, inter alia, in U.S. Pat. No. 2,196,016, U.S. Pat. No. 2,915,475, U.S. Pat. No. 2,645,616 and U.S. Pat. No. 2,798,049. A preferred source of the aluminum halide is the aluminum chlorhydroxy complex described in U.S. Pat. No. 2,571,030 and U.S. Pat. No. 2,876,163.

The amount of the applied alumina coating is not critical, and essentially any amount can be used. Of course, if too little is applied, then not enough benzoic acid or analog will bond to the particulate substrate. Moreover, beyond a certain level or amount of coating, no additional advantage is realized. Those skilled in the art can easily determine by routine experimentation how much alumina coating to use in particular applications. In general, however, it has been found that the amounts of alumina on the order of about 1 to 50 wt. %, more typically about 3 to 15 wt. %, or even 5 to 10 wt. %, based on the weight of the substrate particles being coated, works well. When the substrate particles are silica, it is desirable that the amount of alumina coating used is sufficient to provide one to three atoms of aluminum per surface silicon atom in the final powder product.

The inorganic substrate powder used in accordance with the present invention can have essentially any particle size. For example, powders having mean particle sizes as large as 100 or more microns are contemplated. Indeed, the present invention will enhance the compatibility of inorganic fillers in semi-crystalline polymers, regardless of particle size, and so powder substrates of any particle size can be used. Normally, however, the substrate powder will have a mean particle size, as determined by laser light scattering, of 100 microns or less, more typically 25 microns or less or even 10 microns or less or 5 microns or less.

An especially interesting class of substrate particles are composed of nano-particles, i.e., particles having a mean particle size of about 1 micron or less ($\leq$~1000 nm), as determined by as determined by photon correlation spectroscopy. Such substrate particles find particular use in making polymer nucleating agents which function as clarifying agents. Substrate nano-particles having a mean particle size of about 50 to 250 nm, and particularly about 70 to 100 nm, are especially interesting. Mean particle sizes on the order of 5 to 250 nm and even 20 to 100 nm, are contemplated.

Organic Acid Coating

In order to provide an improved polymer nucleating agent in accordance with the present invention, the particle powder substrate describe above is provided with a surface coating of benzoic acid or analog. Although not wishing to be bound to any theory, it is believed that improved polymer nucleating properties are achieved from these compounds because they provide phenyl groups pendant from the inorganic substrate particles which are similar to the pendant phenyl groups found in the ultrafine sorbitol and xylitol acetal nucleating agents of the above-noted Mannion patent, U.S. Pat. No. 5,310,950. In any event, it has been found that the inorganic polymer nucleating agents of the present invention provide especially good clarifying properties in semi-crystalline polymers, substantially as good as those provided by the ultrafine sorbitol and xylitol acetals of the Mannion patent.

In addition to benzoic acid, any other polynuclear organic acid having a carboxyl group bonded directly thereto can also be used to provide the surface coating of the present invention. These acids can be unsubstituted or substituted with one or more non-aromatic substituents. Normally, the substituted acid will contain 1 to 3 substituents independently selected from $C_{1-24}$ alkyl, $C_{1-4}$ alkoxy, hydroxy, halogen, $C_{1-6}$ alkylthio, $C_{1-6}$ alkylsulfoxy and a 4 or 5 membered alkyl group forming a carbocyclic ring with adjacent carbon atoms of the parent phenyl ring of the acid. $C_{1-4}$ alkyl-substituted benzoic acid compounds such as p-methyl benzoic acid and t-butyl benzoic acid are especially interesting. Mixtures of these compounds can be used, if desired.

It should also be appreciated that these acid compounds can be supplied in a derivative form, i.e. in a form which will produce the corresponding anion under the reaction conditions employed. Thus, the acid compound can be supplied in the form of a salt, ester or similar compound so long as the cation, ester or other segment bonded to the carboxyl moiety of the acid does not adversely affect the binding of the anion to the particle substrate to any significant degree.

For convenience, the organic acid and derivative compounds that are useful in the present invention are referred to here as "benzoic acid compounds."

Bonding the Organic Acid Compound to the Particle Substrate

The benzoic acid compounds of the present invention can be bonded to the inorganic substrate particles in the same way as described in the above-noted U.S. Pat. No. 6.537.665 namely by evaporating the water from an aqueous mixture containing the particles and the benzoic acid compound dissolved or dispersed therein.

Benzoic acid and some of its derivates will dissolve and/or easily disperse in water by simple mixing, especially if in neutralized form. Some may require heating for this purpose. In either case, no additional adjuncts need be added to the mixture to promote intimate contact between the substrate particles and the benzoic acid compound. Other benzoic acid compounds, however, may not dissolve or easily disperse in water even with heating, and in this instance a surfactant or similar material can be added to promote the necessary contact. Although any type of surfactant can be used, amphilitic surfactants, i.e. surfactants having distinct hydrophobic and hydrophilic sections, are preferred. Thus, anionic and cationic surfactants are preferred. Examples of suitable amphilitic surfactants are sodium dodecylbenzene sulfonate, sodium stearate and sodium dodecylsulfate.

The relative amounts of ingredients included in the mixture can vary widely, and essentially any amounts can be used. Normally, the benzoic acid compound will be present in an amount of 1 to 100 wt. %, more typically 5 to 50 wt. %, and even more typically 20 to 40 wt. %, based on the weight of substrate particles in the mixture. In addition, when a surfactant is needed, an effective amount should be used, i.e., enough to fully disperse the benzoic acid compound but not so much that the excess is wasted. The particular amount of surfactant to use in specific embodiments of the invention depends primarily on the benzoic acid compound being used and can easily be determined by routine experimentation. As an example, benzoic acid compounds containing long chain alkyl groups can use 100% or more surfactant based on the weight of the benzoic acid compound, while sodium benzoate normally requires no surfactant at all.

In some instances, the aqueous mixture of substrate particles and benzoic acid compound is most easily prepared by adding a solution or dispersion of the benzoic acid compound to a previously-formed sol of the substrate powder. In that instance, the amount of benzoic acid compound added to the sol can conveniently be 1 and 40 pph (parts per hundred) based on the weight of the sol, more typically 5 to 30 pph. In addition, the amount of surfactant, if used, is conveniently between about 1 to 40 pph based on the weight of the sol, more typically 5 to 30 pph.

Agglomerates

A desirable feature of the nano-sized polymer nucleating agents describe in U.S. Pat. No. 6.537.665 is that they maintain their particle size distribution substantially free from clumping or agglomeration, In other words, upon drying, these nucleating agents form a powder which is dispersible without agglomeration in non-polar solvents as well as in thermoplastic polymers.

Although this feature is desirable in the present invention as well, it has been found that the inventive polymer nucleating agents will exhibit their superior nucleating properties even if clumping or agglomeration occurs. If agglomeration does occur, it is nonetheless desirable that the product as a whole have a mean particle size of 40 microns or less, preferably 25 microns or less, or even 15 microns or less. More desirably, no more than about 50 wt. % of the product, more typically no more than 25 wt. % or even 15 wt. % of the product will have a mean particle size greater than 40 microns, preferably greater than 25 microns.

It is also possible in accordance with the present invention to substantially eliminate these agglomerates, or at least substantially reduce their size and/or amounts, by fluid energy milling or other vigorous mixing technique. Thus, the inventive polymer nucleating agents can easily be made to have a mean particle size of about 0.01 to 10 microns, more typically 0.5 to 4 microns, for example. Particle sizes essentially the same as described above in connection with the substrate particles are also contemplated. Such polymer nucleating agents function especially well as clarifying agents because of their small particle size and superior nucleating properties.

Resin Compounding

The inventive polymer nucleating agents are used in the same way as conventional nucleating agents, i.e., by causing the nucleating agent to disperse throughout the mass of the polymer being treated while molten. This can be done, for example, by mixing the nucleating agent in powder form with the polymer immediately before it is molded, extruded or otherwise thermoformed into a final product. More typically, however, the nucleating agent will be supplied to the polymer in the form of preformed polymer pellets containing a high concentration of the nucleating agent.

The amount of inventive polymer nucleating agent that can be included in polymer compositions in accordance with the present invention can vary widely, and essentially any amount can be used. Generally, the amount used should be sufficient to produce a noticeable nucleating effect but not so much that little or no incremental advantage is achieved. In general this means that the amount used will be at least about 0.001 wt. % but usually no more than about 25 wt. %, based on the weight of the polymer. More typical concentrations are on the order of about 0.1 to 10 wt. % or even 0.25 to 3 wt. %, based on the weight of the polymer.

Other Ingredients

Other conventional ingredients can be included in polymers nucleated with the inventive nucleating agents, so long as they do not adversely affect these nucleating agents in any significant way. Examples include plasticizers lubricants, catalyst neutralizers, antioxidants, UV stabilizers, dyes, pigments, fillers, other nucleating agents and the like.

In addition, other organic acids, in addition to the benzoic acid compounds discussed above, can be reacted with the substrate particles described above for producing improved polymer nucleating agents in accordance with the present invention. Examples are the organic acids described in the above-noted U.S. Pat. No. 6,537,665 i.e., saturated and monounsaturated higher fatty acids such as oleic acid, stearic acid and palmitic acid, partially esterified phosphoric acid, di-2-ethylhexyl phosphoric acid, derivatives of these acids and so forth. Of course, the amount of such additional organic acid should not be so much that the advantages of the present invention are lost.

WORKING EXAMPLES

In order to more thoroughly describe the present invention, the following working examples are provided.

Example 1

Alumina Coated Silica Surface Coated with Benzoic Acid

Preparation of the Alumina-Coated Silica Nano-Particle Substrate 2250g of silica sol (pH 3.0–4.0) in which the silica particles had a mean size of 85 nm was diluted with water in a four liter beaker to provide a concentration of approximately 27% by weight. In a separate beaker 107 grams of 50% aluminum chlorohydrol solution was mixed with 810 grams of water. This mixture was added to the four liter beaker of silica sol and stirred at 600 rpm for 10 minutes. 167 grams of bicarbonate form of IRA 67 (an ion exchange resin from Rohm and Haas) was added and the beaker was then heated to ~85° C. with moderate stirring. This mixture was then allowed to cool to room temperature.

Then 107 grams of concentrated 50% aluminum chlorohydrol solution was added and stirred for 10 minutes. An additional 167 grams of the ion exchange resin was next added, and the mixture was heated to ~85° C. while stirring. This mixture was cooled to room temperature to complete the formation of the alumina coating. The resin was removed by filtering through a Buchner funnel. The pH was 6.5 and the conductivity was 480 micromhos/cm.

The liquid was then filtered through a standard 11 micron filter (Whatman #11) to remove any micro gels, thereby producing an aqueous sol of alumina coated silica particles containing ~7.5% alumina based on the weight of the silica in which the particles had a mean particle size of ~110 nm.

Surface Coating the Nano-Particle Substrate with Benzoic Acid.

1600 grams of water was added to a 3 gallon kettle with a lid. The water was heated to ~95° C. while mixing at 500 rpm. 84 grams of benzoic acid was added to the heated water. 84 grams of sodium benzoate was added next. 2000 grams of alumina coated silica made in Example 1 above was placed in a four liter beaker. When temperature of benzoic acid mixture was stable at ~95° C., the alumina coated silica sol was pumped into the benzoic acid kettle at a rate of 45 ml/min, with care being taken to keep the mixture at or above 95° C. throughout the addition process. Heating and stirring of the mixture was continued for an additional hour after all of the sol was added, after which the mixture was cooled to produce the product benzoic acid treated aluminum coated silica sol.

Spray Drying to Make Powder

The benzoic acid treated aluminum coated silica sol was then spray dried into a fine powder using a NERCO spray dryer. This was done by pumping the sol into the air powered atomizer at a rate of ~50 ml/min, using an inlet temperature of ~450° F. and an outlet temperature of ~200° F. The powdered end product had a mean particle size of approximately 20 microns when measured on the Malvern particle size analyzer, which can be reduced to a mean particle size of approximately 1–2 microns by jet milling.

Example 2

Alumina Coated Silica Surface Coated with p-Methyl Benzoic Acid 2560 grams of water was added to a 5 gallons kettle with lid. The water was heated to ~95° C. while mixing at 500 rpm. 250 grams of p-methyl benzoic acid was added to the heated water. 68.5 grams of 50% concentrated sodium hydroxide was added next. 3200 grams of alumina coated silica made in Example 1 above was then placed in a four liter beaker. When temperature of the benzoic acid mixture was stable at ~95° C., the alumina coated silica sol was pumped into benzoic acid kettle at a rate of 45 ml/min, care being taken to keep the mixture at or above 95° C. throughout the addition process. Mixing and heating were continued for an hour after all of the sol was added, after which the mixture was cooled to produce product p-methyl benzoic acid treated aluminum coated silica sol. This material was then spray dried using the same method used in Example 1 above.

Example 3

Nucleating Polypropylene

The polymer nucleating agent produced in Example 1 was compounded into Profax 6523 polypropylene available from Bassell and then formed into a test flexural bar for determining the effect of the agent on the polymer. This was done by extruding a mixture containing 90 wt. % of fresh polymer and 10 wt. % of the nucleating agent through a Leistritz twin screw extruder to form a master batch of polymer pellets containing the nucleating agent in concentrated form. A portion of this master batch was then mixed with additional fresh polymer and then passed through this extruder again to obtain polymer pellets having the desired concentration of nucleating agent. A commercially available antioxidant was also included in the polymer in an amount of 0.2 wt. %. The pellets so formed were then injection molded into the test flexural bar using a Cincinnati Milacron 33 ton molder at a melt temperature of 195° C. and a mold temperature of 38° C.

Example 4

Nucleating Polypropylene

Example 3 was repeated except that the nucleating agent of Example 2 was used instead of the nucleating agent of Example 1.

Comparative Examples A–K

Examples 3 and 4 were repeated using eleven different polymer nucleating agents outside the scope of this invention. In Comparative Examples A–D, conventional organic polymer nucleating agents were used. In Comparative Examples E and F, silica and alumina-coated silica were used. Finally, in Comparative Examples G–K, polymer nucleating agents produced in the same way as those of Examples 1 and 2 were used except that organic acids outside the scope of the invention were used to provide the final surface coating.

These polymer nucleating agents, including the inventive polymer nucleating agents of Examples 1 and 2, are more thoroughly described as follows:

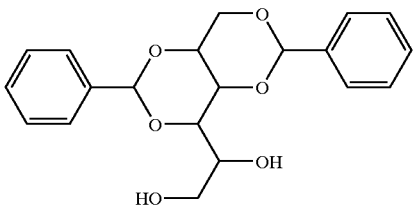

A: dimethyl (1,3:2,4) dibenzylidene sorbitol

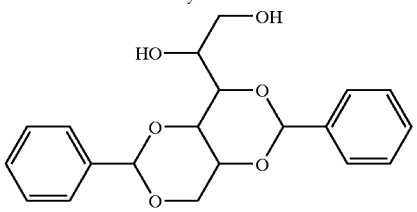

B: (1,3:2,4) dibenzylidene sorbitol

C: Na Benzoate
D: Na Toluate
E: 1.5 micron uncoated silica
F: alumina-coated silica

G

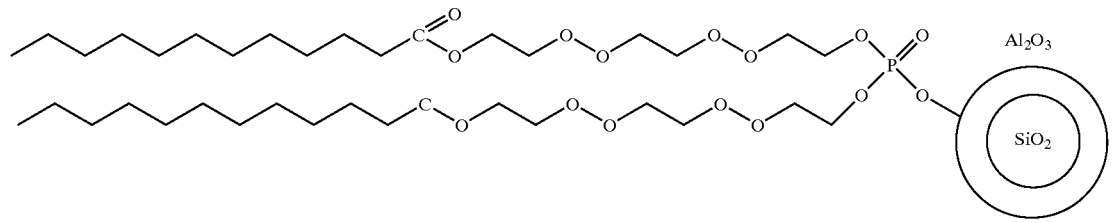

H

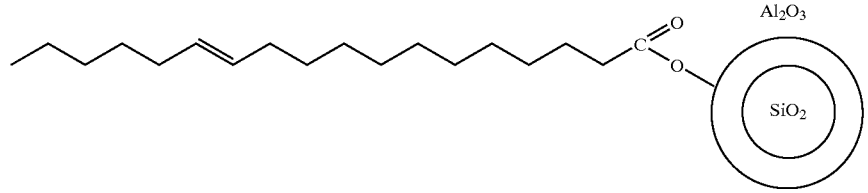

I

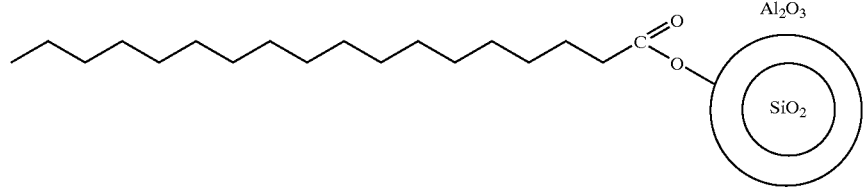

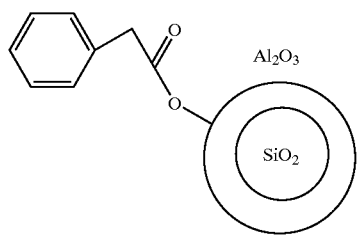

J

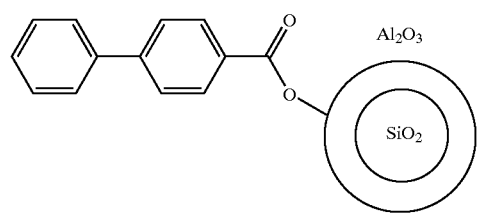

K

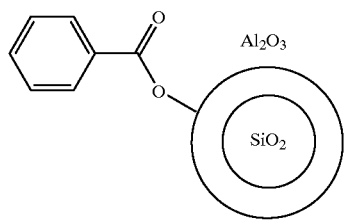

3

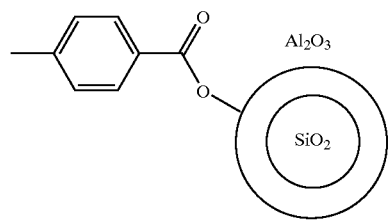

4

To determine the effect of these nucleating agents on the polymer, the following analytical tests were run: The nucleating temperature of the polymer in each example was determined by Differential Scanning Calorimetry. This was done by heating the polymer to 200° C. at a rate of 20° C. per minute, holding the polymer at this temperature for 2 minutes and then cooling the polymer at a rate of 10° C. per minute to 35° C. The temperature at which crystallization started to happen, i.e. the onset of crystallization, was recorded as the nucleating temperature. The haze value of each polymer was determined with respect to light at wavelengths of 400 nm, 500 nm and 600 nm using a Cintra UV-Vis spectrometer. Percent haze was calculated according to ASTM D 1003–97. The flexural modulus of each polymer, after aging, was also determined according to ASTM D790M-93.

The results obtained are set forth in the following Tables 1–3:

TABLE 1

| | Nucleating Temperatures ° C. | | | |
|---|---|---|---|---|
| Ex/Conc | 0.25% | 0.50% | 1.00% | 10.00% |
| Resin | 118 | | | |
| A | 133 | 133 | 133 | 120 |
| B | 125 | 125 | 125 | 135 |
| C | 119 | 121 | 123 | 132 |
| D | | 122 | 124 | |
| E | | 122 | 122 | |
| F | | 121 | 122 | |
| G | | 114 | 114 | 114 |
| H | | 115 | 115 | 114 |
| I | | 114 | 115 | 115 |
| J | | 115 | 115 | |
| K | | 115 | 115 | |
| 3 | 127 | 130 | 131 | 138 |
| 4 | 129 | 130 | 133 | 138 |

TABLE 2

| | Haze Values | | | | | | | | |
|---|---|---|---|---|---|---|---|---|---|
| | Light | | | | | | | | |
| | 600 nm | | | 500 nm | | | 400 nm | | |
| Conc | 0.25% | 0.50% | 1% | 0.25% | 0.50% | 1% | 0.25% | 0.50% | 1% |
| Resin | 36.10% | | | 43.10% | | | 53.20% | | |
| A | 9.50% | 12% | | 13.10% | 18% | | 21.34% | 27% | |
| B | 13.00% | 14.00% | | 18.00% | 20.00% | | 28.00% | 30.00% | |
| C | | 42.90% | 72% | | 55.23% | 71.15% | | 64.50% | 79.48% |
| D | | 34.87% | 51% | | 43.40% | 66% | | 56.70% | 79% |
| E | | 31.65% | 28% | | 39.38% | 34.80% | | 51.02% | 45.40% |
| F | | 27.25% | 34% | | 34.69% | 40.52% | | 44.32% | 51.80% |
| G | | | | | | | | | |
| H | | 30% | 28% | | 37% | 35.00% | | 47% | 45.00% |
| I | | 30% | 28% | | 37% | 35.00% | | 47% | 45.00% |

TABLE 2-continued

| | Haze Values | | | | | | | | |
|---|---|---|---|---|---|---|---|---|---|
| | Light | | | | | | | | |
| | 600 nm | | | 500 nm | | | 400 nm | | |
| Conc | 0.25% | 0.50% | 1% | 0.25% | 0.50% | 1% | 0.25% | 0.50% | 1% |
| J | | 32.10% | 33% | | 35.00% | 37% | | 48.00% | 49% |
| K | | 31% | 31% | | 35% | 35% | | 48% | 48% |
| 3 | 25.09% | 21% | 18% | 33.12% | 29% | 27% | 49.78% | 44% | 42% |
| 4 | 21% | 16% | 14% | 28% | 24% | 21% | 40% | 36% | 33% |

TABLE 3

| | Flexural Modulus | | | | |
|---|---|---|---|---|---|
| Ex/Conc | 0.25% | 0.50% | 1.00% | 5% | 10% |
| Resin | 185000 | | | | |
| A | 200000 | | | | |
| B | 200000 | | | | |
| C | 195000 | 198000 | 200000 | | |
| D | | 190000 | 195000 | | |
| E | | 177000 | 183000 | | |
| F | | 170000 | 174000 | | |
| G | | | 195000 | 196000 | 190000 |
| H | | 185000 | 190000 | 195000 | |
| I | | 193000 | 196000 | 200000 | 200000 |
| J | | 188000 | 190000 | | |
| K | | 190000 | 192000 | | |
| 3 | | 190000 | 200000 | 210000 | |
| 4 | | 210000 | 215000 | 220000 | |

From these tables, it can be seen that the inventive polymer nucleating agents exhibit substantially improved polymer nucleating properties relative to previously known polymer nucleating agents as well as compared with similar products made with organic acids outside the scope of the present invention. For example, these tables show that the polymer products of Examples 3 and 4 exhibit higher nucleating tempertures, better haze values and superior flexural modulus compared with nucleated polymers made with prior art organic nucleating agents (Comparative Examples A–D), compared with uncoated inorganic nucleating agents (Comparative Examples E and F) and compared with inorganic nucleating agents made in the same way as those of Examples 3 and 4 except using organic acids outside the scope of the present invention (Comparative Examples G–K). Note, especially, Comparative Examples J and K which show that nucleating agents made with an aromatic-substituted benzoic acid (Comparative Example K) or an aromatic acid whose carbonyl group is not directly attached to its phenyl group (Comparative Example J) do not show the enhanced results of Examples 3 and 4. It was also observed that the Izod impact strength of the polymer was improved slightly or at least maintained at a similar level when the inventive nucleating agents were added at low concentration levels. The heat deflection temperature was also observed to be increased by a magnitude of 20° C. even when the inventive nucleating agents were added at low concentration levels (e.g., ~0.5%).

Although only a few embodiments of the present invention have been described above, it should be appreciated that many modifications can be made without departing from the spirit and scope of the invention. All such modifications are intended to be included within the scope of the present invention, which is to be limited only by the following claims:

We claim:

1. A polymer nucleating agent comprising inorganic particles having a benzoic acid compound bonded thereto, the inorganic particles comprising inorganic substrate particles carrying an anchor layer capable of bondina to an oraanic acid, the benzoic acid compound being benzoic acid or a polynuclear aromatic acid having its carboxyl group directly attached to its polynuclear aromatic ring, the benzoic acid or polynuclear aromatic acid being unsubstituted or substituted with one or more non-aromatic sub stituents.

2. The polymer nucleating agent of claim 1, wherein the benzoic acid compound is unsubstituted or substituted benzoic acid.

3. The polymer nucleating agent of claim 2, wherein the benzoic acid compound is substituted benzoic acid substituted with 1 to 3 substituents independently selected from $C_{1-24}$ alkyl, $C_{1-4}$ alkoxy, hydroxy, halogen, $C_{1-6}$ alkylthio, $C_{1-6}$ alkylsulfoxy and a 4 or 5 membered alkyl group forming a carbocyclic ring with adjacent carbon atoms of the parent phenyl ring of the benzoic acid compound.

4. The polymer nucleating agent of claim 2, wherein the benzoic acid compound is benzoic acid, p-methyl benzoic acid, t-butyl benzoic acid or a mixture of these compounds.

5. The polymer nucleating agent of claim 1, wherein the anchor layer is alumina.

6. The polymer nucleating agent of claim 5, wherein the inorganic particles comprise alumina-coated silica.

7. The polymer nucleating agent of claim 6, wherein the inorganic particles have a mean particle size of about 1 micron or less.

8. The polymer nucleating agent of claim 7, wherein the polymer nucleating agent has a mean particle size of about 0.01 to 10 microns.

9. The polymer nucleating agent of claim 8, wherein the benzoic acid compound is substituted or unsubstituted benzoic acid.

10. The polymer nucleating agent of claim 9, wherein the benzoic acid compound is benzoic acid unsubstituted or substituted with 1 to 3 substituents independently selected from $C_{1-24}$ alkyl, $C_{1-4}$ alkoxy, hydroxy, halogen, $C_{1-6}$ alkylthio, $C_{1-6}$ alkylsulfoxy and a 4 or 5 membered ailcyl group forming a carbocyclic ring with adjacent carbon atoms of the parent phenyl ring.

11. The polymer nucleating agent of claim 1, wherein the polymer nucleating agent has a mean particle size of about 0.01 to 10 microns.

12. The polymer nucleating agent of claim 11, wherein the inorganic particles have a mean particle size of about 1 micron or less.

* * * * *